No. 856,973. PATENTED JUNE 11, 1907.
N. MARSHALL.
GLASS SEVERING MACHINE.
APPLICATION FILED NOV. 7, 1905.
4 SHEETS—SHEET 1
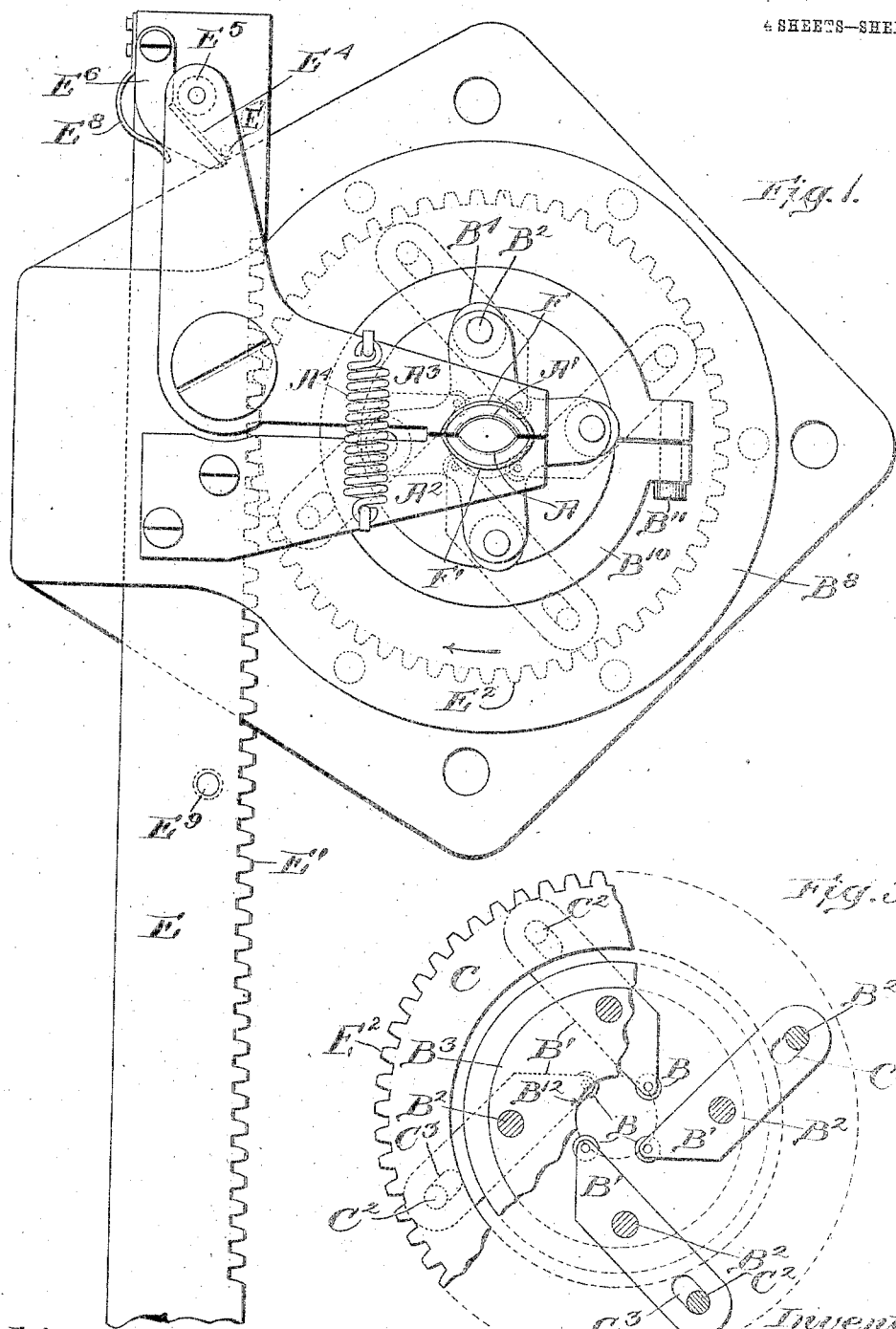
Witnesses:
Katharine A. Dugan
Geo. N. Goddard
Inventor:
Norman Marshall
by Ira L. Fish
Atty.

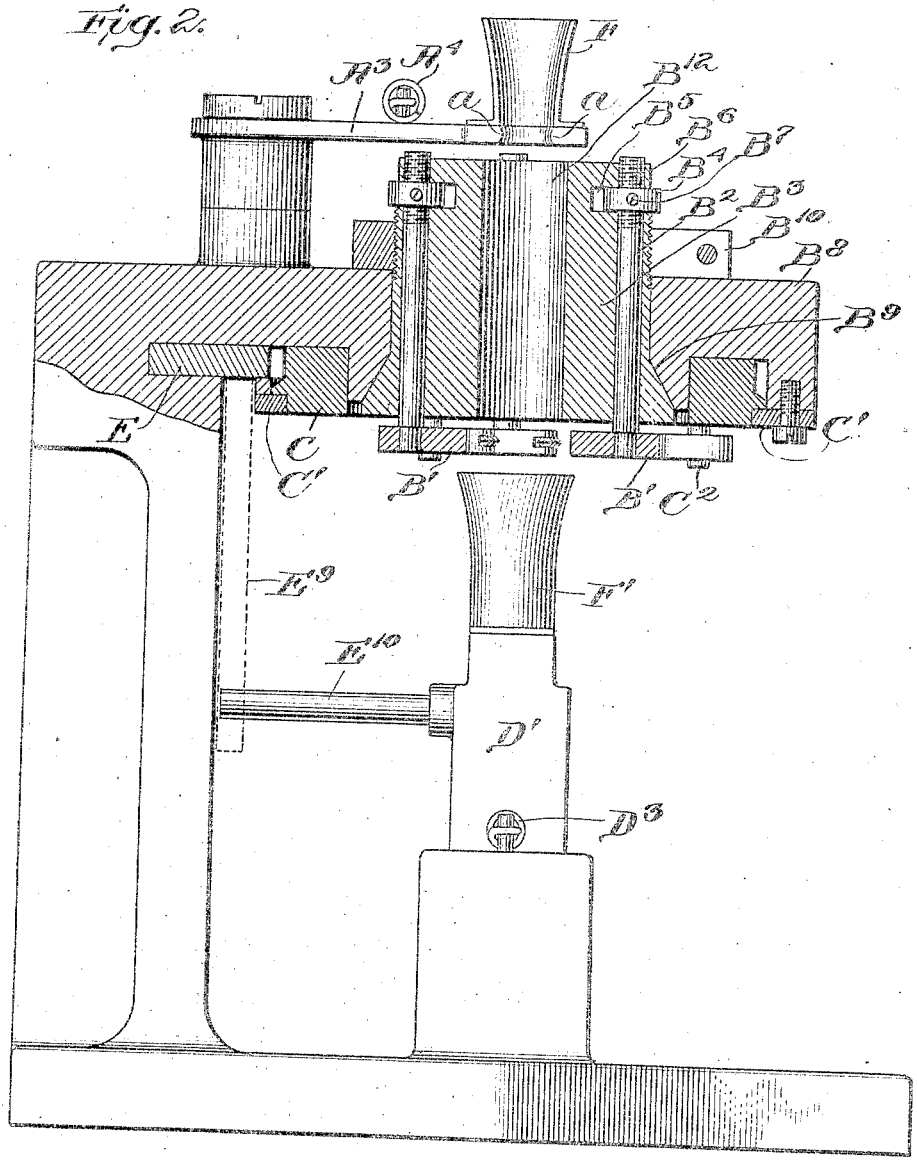

No. 856,973. PATENTED JUNE 11, 1907.
N. MARSHALL.
GLASS SEVERING MACHINE.
APPLICATION FILED NOV. 7, 1905.
4 SHEETS—SHEET 3.
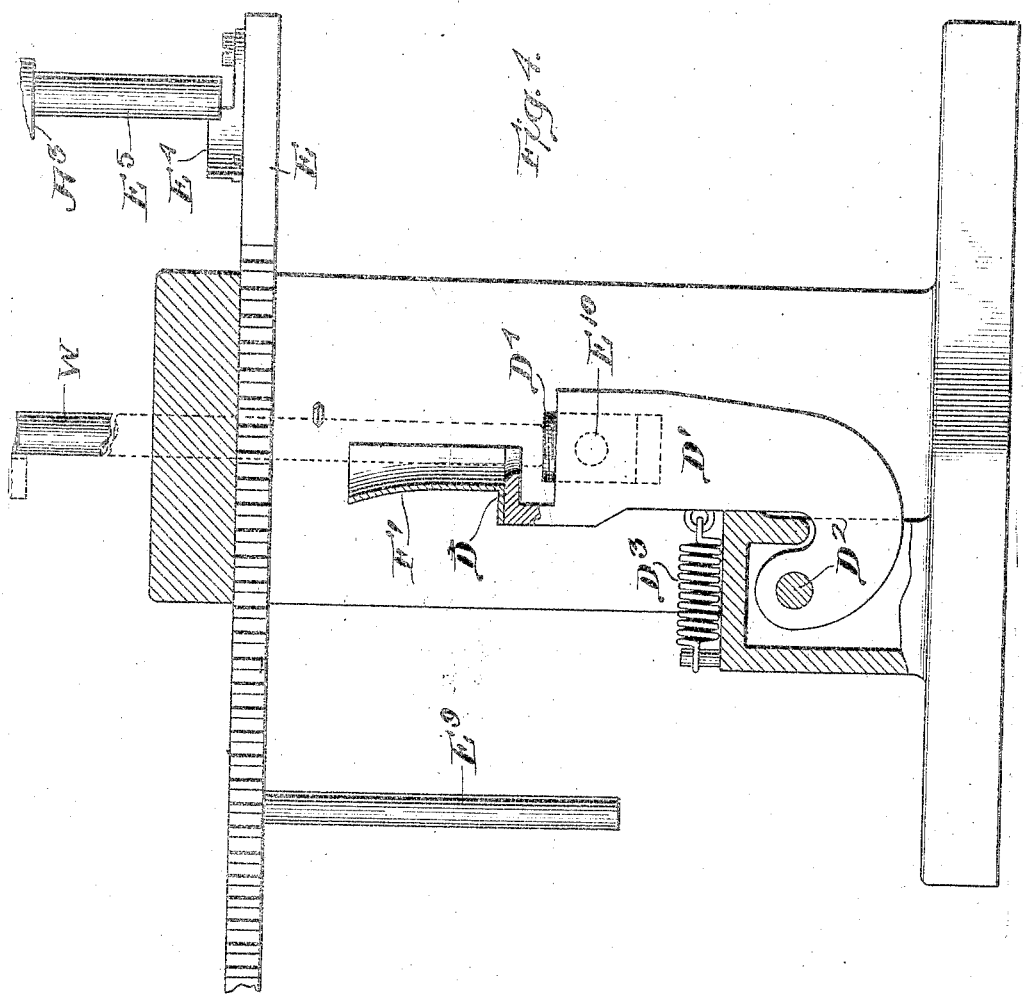

No. 856,973. PATENTED JUNE 11, 1907.
N. MARSHALL.
GLASS SEVERING MACHINE.
APPLICATION FILED NOV. 7, 1905.
4 SHEETS—SHEET 4.
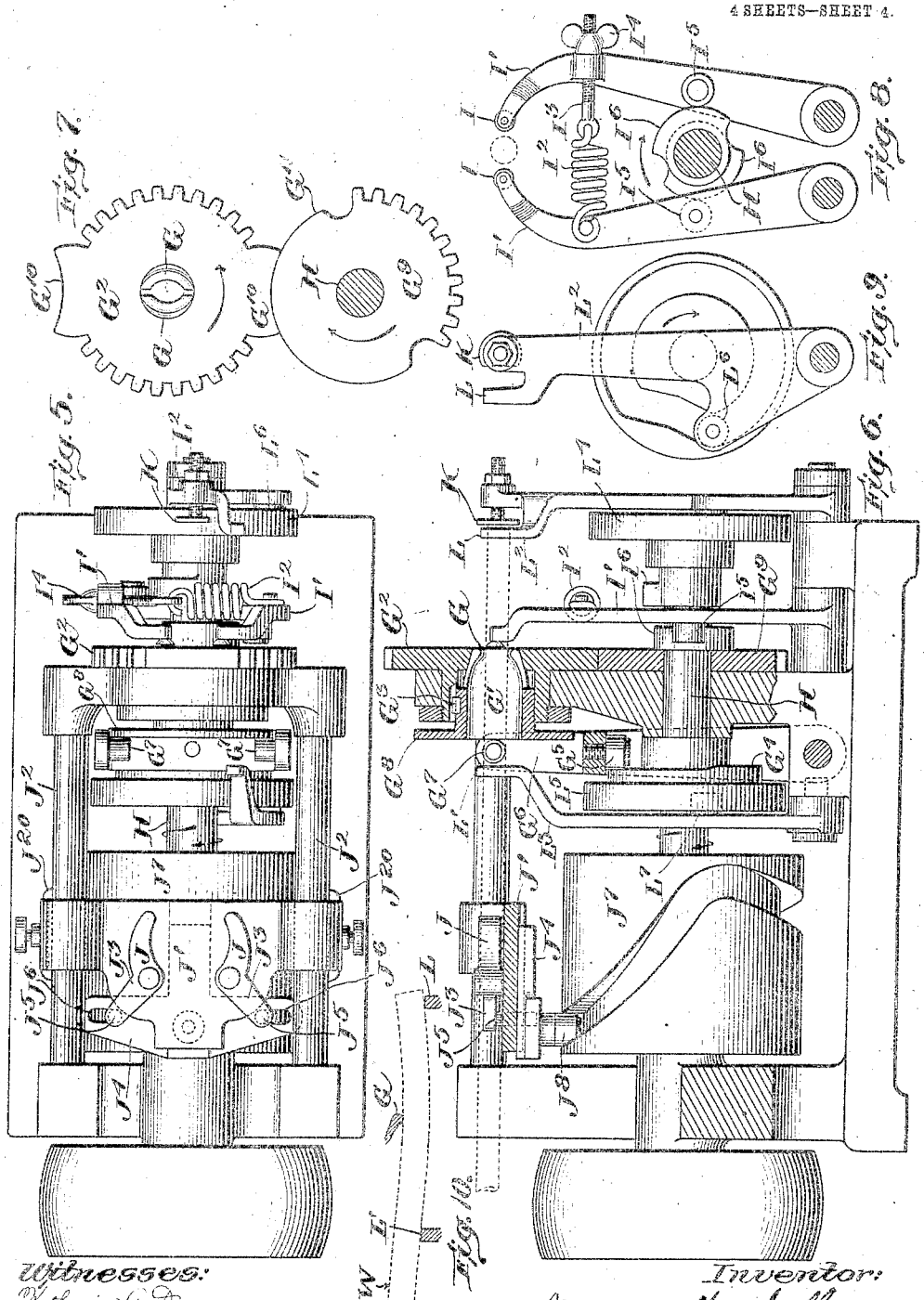
Witnesses:
Katherine U. Dugan
Geo. N. Goddard
Inventor:
Norman Marshall
by Ira L. Fish
Attorney.

UNITED STATES PATENT OFFICE.

NORMAN MARSHALL, OF NEWTON, MASSACHUSETTS.

GLASS-SEVERING MACHINE.

No. 856,973.          Specification of Letters Patent.          Patented June 11, 1907.

Application filed November 7, 1905. Serial No. 286,191.

*To all whom it may concern:*

Be it known that I, NORMAN MARSHALL, a citizen of the United States, and a resident of Newton, county of Middlesex, Massachusetts, have invented certain new and useful Improvements in Glass-Severing Machines, of which the following is a specification.

The invention relates to a machine for severing glass rods and its primary object is to provide a machine which may be successfully used in severing short lengths from a rod of glass tubing.

Comparatively short pieces of glass tubing are extensively used in the manufacture of incandescent electric lamps as well as for other purposes and so far as I am aware it has been the practice heretofore to sever these short pieces of glass tubing from a rod of tubing by drawing the tube along the edge of a file and at the same time turning the tube so as to score it for a part of its circumference, the tube being then broken while held in the hands of the operator. In severing the glass tube in this manner there is a large waste due to imperfect breaking of the tube at the point where it has been drawn across the edge of the file. The manipulation of the tube also requires care and skill on the part of the operator and at best this manner of severing the tubes is slow and unsatisfactory.

In practicing the present invention the objections to the prior method of severing glass rods are eliminated and the rods may be divided into short lengths in a rapid and economical manner the rod being severed in a substantially perfect manner and with little or no waste. I accomplish these results by combining in a machine for severing glass rods devices which operate to score the rod circumferentially and break it at the scored point. The means which I prefer to employ for scoring the rod circumferentially comprise one or more scoring cutters and rod holding jaws, the scoring cutters or jaws being so mounted that they may be rotated about the axis of the rod to be severed, thus causing a relative rotary movement between the rod and scoring cutters. After the rod has been scored it is broken at the scored point by deflecting it against the cutter or against a support close to the cutters, the rod being so held during the breaking that it is not restrained from assuming its natural position under the action of the deflecting forces. When the rod is thus scored and then deflected either against the cutters or against a support close to the scored point, the rod will break cleanly and evenly at the scored point thus avoiding the waste due to shattering of the glass at and near the scored point which frequently occurs in breaking the rod manually as heretofore practiced. The deflection of the rod to cause the breaking at the scored point may be produced by applying pressure to the rod at one or both sides of the scored point or may be produced by supporting the rod at both sides of the scored point and applying deflecting force at or near the scored point by lateral movement of the cutters or of the support over which the tube is deflected.

The various features of the invention will be set forth in the claims and will be understood from the following detailed description of the mechanisms in which I have embodied them. For the purpose of illustration I have shown two forms of machines embodying the broader features of my invention and it will be understood that other forms of mechanism than those shown may be employed for effecting the essential operations incident to the scoring and to the scoring and breaking of the rods in a practical and successful manner.

In the accompanying drawings—Figure 1 is a plan view of a machine embodying the various features of the invention in one of the forms in which I prefer to use them; Fig. 2 is a transverse sectional view through the axis of the holding and scoring devices shown in Fig. 1; Fig. 3 is a detail plan view showing the arrangement of the scoring cutters; Fig. 4 is an elevation looking toward the left in Fig. 1, many of the parts being omitted for the sake of clearness; Fig. 5 is a plan view of a different form of machine embodying the invention; Fig. 6 is a vertical section through the center of the machine, certain parts being shown in elevation; Fig. 7 is a detail showing the driving mechanism for the rod holding clamps; Fig. 8 is a detail showing the cams for operating the scoring cutters; Fig. 9 is a detail showing the cam for operating the feeding stop and breaker fingers. Fig. 10 is a diagrammatic view showing the manner of breaking the rod.

In the construction of machine shown in Figs. 1 to 4 inclusive, the rod of tubing W which is to be divided into short lengths is held in a vertical position during the scoring and breaking operations and is fed downward by its own weight after the desired length of tubing has been severed from its lower end. In this construction during the scoring operation the rod of tubing is held from rotation between two clamping jaws A A'. The clamping jaw A is formed at the outer end of a fixed arm A² while the clamping jaw A' is formed on the outer end of a bell-crank lever A³ pivoted to the frame of the machine and forced toward the jaw A by a spring A⁴. The faces of the clamping jaws are curved so as to conform somewhat to the curvature of the glass tubing, the curvature of the jaws however being somewhat greater than the curvature of the tubing. The faces of the jaws are also curved in a direction longitudinal of the tube, as indicated at *a* Fig. 2, so that the jaws bear against the tube about a circumferential line and will thus allow the tube to assume a natural position when grasped by the jaws and also during any deflection of the tube when it is being broken at the scored point.

The scoring cutters B, of which there are four in the construction shown, are carried on the inner ends of levers B'. These cutter carrying levers B' are secured to the lower ends of rock shafts B² which are mounted in a head B³. The rock shafts and attached cutter carrying levers may be adjusted vertically to bring the cutters into exact alinement by means of adjusting nuts B⁴ threaded upon the shafts and arranged in slots B⁵ formed between arms B⁶ and the upper end of the head B³ on which the arms are formed. These nuts are held in position upon the rock shafts by means of binding screws B⁷.

The cutter carrying head B³ is mounted in the stationary plate B⁸ and is held frictionally against rotation by means of conical friction surfaces B⁹ formed on the plate B⁸ and head B³ respectively. The upper end of the head is screw-threaded and the friction surfaces B⁹ are held in engagement with each other by means of a split nut B¹⁰ screw-threaded on the upper end of the head and engaging the upper surface of the plate B⁸. By turning the nut B¹⁰ the head may be adjusted to vary the friction between the friction surfaces B⁹ and after the friction has been properly adjusted the nut B¹⁰ is held in position upon the head by tightening the clamping bolt B¹¹. The cutter carrying head is provided with a central opening B¹² for the passage of the rod of tubing.

The cutter carrying levers B' are operated to force the cutters against the glass tubing and the cutter carrying head is revolved to carry the cutters circumferentially about the tubing by means of an actuating ring C which is mounted concentrically with the cutter head. This actuating ring C is mounted to rotate within a recess formed in the under sides of the plate B⁸, being held in said recess by means of an annular plate C'. The ring C is connected with the cutter carrying levers B' by means of pins C² projecting downwardly from the ring through slots C³ formed in the levers. When the ring C is moved in the direction of the arrow Fig. 1 the pins C² acting in the slots C³ will swing the levers B' about their pivots forcing the cutters B inward against the glass tubing. When the inward movement of the cutters is arrested by their engagement with the glass tubing, the continued movement of the ring C will rotate the cutter carrying head and thus move the cutters circumferentially about the tubing at the same time maintaining the pressure of the cutters against the tubing. The force with which the cutters are pressed against the tubing will depend upon the frictional resistance offered to the rotation of the cutter head by the friction surface B⁹ and this friction may be adjusted to secure the proper operation of the cutters for the class of work which is being performed. After the scoring has been completed and the ring C is rotated in the reverse direction the first movement of the ring will carry the pins C² to the outer ends of the slots C³ thus swinging the cutters back away from the tubing and then continued movement of the ring will rotate the cutter carrying head and thus return the cutters to their initial position.

While the cutters are still in engagement with the tubing and at the time that two of the cutters are in position to support the tube on the side opposite the fixed jaw A, pressure is applied to the lower end of the tube on the same side as the fixed jaw A. This pressure in connection with the resistance offered by the fixed jaw A tends to deflect the tube against the supporting cutters. By this means the tube is broken at the scored point without any material shattering of the glass at this point. In the construction shown the device for applying pressure to the lower end of the tube consists of a breaking finger D formed on the upper end of a pivoted lever D'. The lever D' is pivoted at D² and is held in normal position by a spring D³. In addition to the breaking finger D the lever D' also carries an adjustable support D⁴ upon which the lower end of the tube rests during the scoring operation and which forms an adjustable feeding stop for determining the length of tube to be severed from the end of the rod of tubing. The pivot D² of the lever D' is arranged back of the vertical line of the tubing so that when the lever is swung forward to bring the breaking finger D into engagement with the lower end of the tubing the stop D⁴ is moved downward away from the lower end of the tubing so that it will not prevent the tubing from assuming a natural position under the deflecting pressure applied thereto. I prefer also to provide the finger D with an engaging surface curved in the direction of the tubing so that it will bear upon the tubing along a circumferential line and will not tend to prevent the tube from assuming the position which it would naturally assume under the influence of the deflecting strains.

In the form of mechanism shown the parts already described are operated from a reciprocating bar E. This bar is connected with the operating ring C by means of a rack E′ formed on the bar and engaging a gear $E^2$ formed on the operating ring. As the bar E is reciprocated the operating ring is oscillated through its connection to operate the scoring cutters and carry them circumferentially about the tubing in the manner described. The pivoted gripper jaw carrying lever $A^3$ is operated at proper intervals to open and close the rod holding gripper jaws by means of a cam $E^4$ mounted on the bar E and arranged to engage a roll $E^5$ carried by the lever $A^3$. The cam $E^4$ is formed on an arm $E^6$ pivoted to the bar E and held yieldingly in position against a stop $E^7$ by a spring $E^8$. During the forward movement of the bar E the cam $E^4$ strikes the roll $E^5$ and the arm $E^6$ yields to allow the cam to pass idly by the roll $E^5$. As soon as the cam has passed the roll, the spring $E^8$ returns the cam to normal position and during the return movement of the bar E the cam acts against the roll $E^5$ to open the jaws of the rod holding gripper so that the feed of the rod takes place, after which the roll $E^5$ rides off the end of the cam so that the gripper jaws close upon the rod of tubing and hold it preparatory to the next scoring operation. As the scoring is completed and the bar E reaches the end of its forward stroke, a pin $E^9$ carried by the bar strikes a pin $E^{10}$ which projects laterally from the lever D′ and swings the lever D′ toward the right in Fig. 4, thus effecting the breaking operation.

To facilitate the introduction of the rod of tubing into the machine and to insure the proper positioning of the tube upon the feed stop $D^4$ when the downward feed of the tube takes place, guards F F′ may be secured to the gripping jaws and the breaking finger respectively, as indicated in Figs. 2 and 4.

This machine which has been just described provides a simple and efficient mechanism by which rods of tubing may be rapidly, accurately and economically divided into short lengths and the construction is well adapted for the arrangement of a series of machines in close proximity to each other where they may be operated by a single reciprocating bar and where a number of machines may be conveniently attended to by a single operator.

In Figs. 5 to 10 a different form of machine embodying the invention is shown. In the machine shown in these figures the rod of tubing is arranged horizontally during the scoring and feeding and the relative rotary movement between the cutters and tubing is produced by rotating the tubing instead of rotating the cutters as in the construction previously described. The rod is held and rotated by means of two gripping jaws G formed on the forward end of a tube G′. The jaws are curved laterally, the curvature of the jaws being somewhat greater than the curvature of the rod of tubing which is to be acted upon as indicated in Fig. 7. The jaws are also curved longitudinally so that they bear upon the tubing along a circumferential line and do not prevent the tube from assuming its natural position when it is deflected during the breaking. The jaws G are spring jaws formed by splitting the tube G′ longitudinally at its forward end and the outer periphery of the jaws is conical to engage a conical bearing in a gear $G^2$ with which the tube G′ is connected by means of a key and slot connection $G^3$. The jaws are closed to grip the rod of tubing by forcing the tube G′ forward, the conical bearing in the gear $G^2$ forcing the spring jaws G inward. When the pressure upon the tube G′ which forces it forward is relieved the spring of the jaws acting against the conical bearings throws the tube G′ backward so that the jaws open to allow the feed of the rod of tubing to take place. The tube G′ is operated and controlled to open and close the jaws at proper intervals by means of a cam $G^4$ secured to the main shaft H and engaging a roll $G^5$ secured to a lever $G^6$ the upper end of which is forked and provided with two rolls $G^7$ arranged to engage a flange $G^8$ on the rear end of the tube G′. The gripping jaws are rotated through the gear $G^2$ by the key and slot connection $G^3$ which causes these two parts to rotate together while leaving the tube G′ free to move longitudinally. The gear $G^2$ and the connected gripping jaws are given a half revolution at suitable intervals by means of a gear $G^9$ secured to the shaft H. The gear $G^2$ is provided with two diametrically opposite locking segments $G^{10}$ and the gear $G^9$ is provided with a coöperating locking segment $G^{11}$. During each revolution of the shaft H the gear $G^9$ acts to turn the gear $G^2$ and the connected jaws through a half revolution and to then hold the gear $G^2$ and connected jaws in the position shown in Fig. 7 while the locking segment $G^{11}$ is passing one of the locking segments $G^{10}$. During the rotary movement of the rod holding jaws the scoring of the rod is effected and during the interval between the rotary movements of the jaws the breaking of the rod at the scored point and the feeding of the rod preparatory to the next scoring operation is performed.

In the construction of machine now being described there are two scoring cutters I arranged on diametrically opposite sides of the tubing so that the rod is scored about its entire circumference during its half revolution.

The scoring cutters are mounted in the upper ends of levers I' which are forced toward the rod by a connecting spring I² the tension of which may be adjusted by an adjusting screw I³ and nut I⁴. The levers I' extend on opposite sides of the shaft H and are provided with rolls I⁵ arranged to engage oppositely arranged cams I⁶ which are secured to the shaft H. The cams I⁶ are so arranged and timed that the scoring cutters are separated during the breaking operation and during the feed of the rod and are forced against the rod during its rotary movement. The cutters I are so arranged that they engage the rod of tubing close to the ends of the jaws G thus scoring the rod at a point close to the point where the jaws G engage the rod.

The feed of the rod is effected by means of two feeding jaws J pivoted to a slide J' which is mounted upon guiding rods J². The slide is frictionally held by adjustable friction shoes J²⁰. The jaws J are arranged on opposite sides of the rod of tubing and are provided with rearwardly extending arms J³ which are connected with a slide J⁴ by means of pins J⁵ which project downwardly into slots J⁶ in the slide. The slide J⁶ is guided in a groove in the under side of the slide J' and is operated by a cam J⁷ which engages a roll J⁸ carried by the slide. When the slide J⁴ is moved forward by the cam J⁷ the first movement of the slide swings the feeding jaws J into engagement with the rod and when the inward movement of the jaws is arrested by engagement with the rod the continued movement of the slide J⁴ causes the jaws and slide J' to move forward, the rod being gripped with a force dependent on the frictional resistance of the devices J²⁰ and carried forward by the jaws J until its forward end is arrested by a feeding stop K. During any further movement of the slide J⁴ after the feed of the rod has been arrested by the stop K, the jaws J slip idly along the rod. When the cam J⁷ acts to withdraw the slide J⁴ the first movement of the slide causes the jaws J to swing away from the rod of tubing leaving it free from any restraint by the jaws during the breaking operation. The continued rearward movement of the slide J⁴ after the pins J⁵ have engaged the inner ends of the slots J⁶ draws the slide J' and the jaws J back to their initial position preparatory to the next forward feed of the rod.

During the feed of the rod of tubing the jaws G are open and the scoring cutters I are held back by the cams I⁶. After the feed has taken place the scoring cutters move inward to engage the rod of tubing, the jaws G are closed and are rotated to give the tubing a half revolution. After the scoring has been thus performed the scoring cutters are retracted and pressure is applied to the tubing in front of and at the rear of the jaws G thus deflecting the tube against the rear jaw G which supports the tube approximately at the point of scoring.

The devices for applying pressure to the tube and thus breaking it at the scored point, consist of two breaking fingers L L' which are carried at the upper ends of levers L² L³. The levers are operated at proper intervals by cams L⁴ L⁵ secured to the shaft H and operating upon rolls L⁶ L⁷ which are mounted on the levers L² L³ respectively. After the scoring has taken place these fingers L L' are moved forward by their cams and press against the rod of tubing, the finger L engaging the tubing near its forward end and the finger L' engaging the rod of tubing at approximately the same distance in the rear of the jaws G. The pressure of these fingers tends to deflect the tube in substantially the manner shown in Fig. 10, the rear jaw G forming a support approximately at the scored point against which the tube is deflected. By reason of the shape of the jaws G and of the arrangement and construction of the feeding devices, the rod of tubing is free to assume its natural position under the deflecting pressure applied by the breaking fingers and the tube is broken evenly and accurately along the scored line.

The feeding stop K may be adjusted to vary the lengths of tubing severed from the end of the rod of tubing. In order that the feed stop may not interfere with the proper breaking of the tubing, it is moved away from the end of the tubing previous to the deflection of the tube in the breaking operation. For this purpose and in order to simplify the construction I prefer to mount the feed stop upon the lever L² which carries the breaking finger L in the manner shown in Figs. 6 and 9, although it may be mounted upon a separate support if desired.

While the constructions and arrangements of parts and mechanisms shown and described are those in which I have embodied my invention and are those which I consider it of advantage to employ, it will be understood that various changes in the construction and arrangements and in the details of the parts may be made in embodying the features of invention in machines designed to operate under particular conditions and which may be found desirable in rendering the mechanisms most efficient for the class of work which is to be performed.

Without attempting to set forth in detail the various forms and constructions in which the features of invention may be embodied, what I claim is:—

1. A machine for severing glass rods having in combination, rod holding jaws, means for opening said jaws for the feed of the rod one or more scoring cutters and means for causing a relative rotary movement between the cutters and rod to score the rod circumferentially.

2. A machine for severing glass rods having in combination, rod holding jaws, one or more scoring cutters, means for causing a relative rotary movement between the cutters and jaws to score the rod circumferentially and rod breaking means.

3. A machine for severing glass rods having in combination, rod holding jaws means for opening said jaws for the feed of the rod and closing the jaws, one or more scoring cutters, means for causing a relative rotary movement between the cutters and rod, and rod breaking means.

4. A machine for severing glass rods having in combination, rod holder jaws, and a scoring device, one of said devices being mounted for rotation about the axis of the rod and means for opening said jaws for the feed of the rod.

5. A machine for severing glass rods having in combination, rod holding means, a plurality of scoring cutters, means for forcing the cutters radially inward against the rod, and means for causing a relative rotary movement between the cutter or cutters and holding means about the axis of the rod to score the rod.

6. A machine for severing glass rods having in combination, rod holding means, one or more scoring cutters, means for forcing the cutter or cutters against the rod, means for causing a relative rotary movement between the cutter or cutters and holding means about the axis of the rod to score the rod, and means for breaking the rod.

7. A machine for severing glass rods having in combination, rod holding jaws, one or more scoring cutters, means for forcing the cutters against the rod, means for opening the jaws for the feed of the stock and for closing the jaws, means for causing a relative rotary movement between the cutters and holding jaws, and means for breaking the rod at the scored point.

8. A machine for severing glass rods having in combination, devices for scoring a rod circumferentially, means for engaging the rod on opposite sides of the scored point and deflecting it against a support approximately at the scored point.

9. A machine for severing glass rods having in combination, rod holding jaws, a feed stop, means for opening the jaws for the feed of the rod, one or more scoring cutters, means for moving the cutters toward and away from the rod, means for causing a relative rotary movement between the cutters and jaws.

10. A machine for severing glass rods having in combination, rod holding devices, one or more scoring cutters, and a breaking finger.

11. A machine for severing glass rods having in combination, rod holding devices, one or more scoring cutters, a breaking finger, and a feed stop.

12. A machine for severing glass rods having in combination, rod holding jaws constructed to engage the rod along substantially a circumferential line, means coöperating therewith to score the rod circumferentially, and a breaking finger.

13. A machine for severing glass rods having in combination, rod holding devices, one or more scoring cutters, one or more carriers for the cutters, a frictionally held head on which the cutter carriers are mounted, and an operating device connected with the head through the carriers.

14. A machine for severing glass rods having in combination, rod holding devices, a frictionally held cutter carrying head, cutter carrying levers mounted on the head, and an actuating ring connected with the cutter carrying levers.

15. A machine for severing glass rods having in combination, a frictionally held cutter carrying head, a cutter lever mounted thereon, and an actuating-ring connected with the lever.

16. A machine for severing glass rods having in combination a frictionally held cutter carrying head, a cutter lever mounted thereon, an actuating ring connected to the lever, a feed stop rod, holding jaws, and a breaking finger.

In witness whereof, I have hereunto set my hand, this 1st day of November 1905.

NORMAN MARSHALL.

In the presence of—
 IRA L. FISH,
 KATHARINE A. DUGAN.